(12) United States Patent
Murata

(10) Patent No.: US 10,151,371 B2
(45) Date of Patent: Dec. 11, 2018

(54) TORQUE TRANSMISSION APPARATUS

(71) Applicant: Honda Motor Co., Ltd., Tokyo (JP)

(72) Inventor: Toshiki Murata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 15/371,113

(22) Filed: Dec. 6, 2016

(65) Prior Publication Data

US 2017/0175847 A1    Jun. 22, 2017

(30) Foreign Application Priority Data

Dec. 16, 2015  (JP) .................. 2015-244709

(51) Int. Cl.
*F16F 15/121* (2006.01)
*F16F 15/123* (2006.01)

(52) U.S. Cl.
CPC .... *F16F 15/1232* (2013.01); *F16F 15/12326* (2013.01)

(58) Field of Classification Search
CPC ................. F15F 15/1232; F15F 15/12326
USPC ................. 464/68.92; 192/205; 267/168
See application file for complete search history.

(56) References Cited

U.S. PATENT DOCUMENTS 5,810,140 A * 9/1998 Billet .................. F16H 45/02
                                                      192/205
2017/0122402 A1* 5/2017 Murata ............ F16F 15/12326

FOREIGN PATENT DOCUMENTS

DE        10335871 A1    3/2005
JP        2000320614 A  11/2000
JP        2015086965 A   5/2015

* cited by examiner

*Primary Examiner* — Greg Binda
(74) *Attorney, Agent, or Firm* — Duft & Bornsen, PC

(57) ABSTRACT

A torque transmission apparatus including a first rotor, a second rotor, an elastic body deployed in a torque transmission path between the first rotor and the second rotor to absorb torque fluctuation between the first and second rotors, and a seat member interposed between the elastic body and the first and second rotors. The seat member includes a holding portion the elastic body at one circumferential end face and a contact surface contactable with a lateral end surface provided in the first rotor and the second rotor at the other circumferential end face, and is formed so that an angle of the contact surface is greater than 90°.

11 Claims, 11 Drawing Sheets

REARWARD ←→ FORWARD

US 10,151,371 B2

TORQUE TRANSMISSION APPARATUS

CROSS-REFERENCE TO RELATED APPLICATION

This application is based upon and claims the benefit of priority from Japanese Patent Application No. 2015-244709 filed on Dec. 16, 2015, the content of which is incorporated herein by reference.

BACKGROUND OF THE INVENTION

Field of the Invention

This invention relates to a torque transmission apparatus having a function of absorbing torque fluctuation.

Description of the Related Art

Apparatuses are known that comprise a first rotor connected to a power source and a second rotor connected to the first rotor through an elastic body, wherein torque of the first rotor is transmitted to the second rotor through the elastic body and the elastic body absorbs torque fluctuation.

In an apparatus described in Japanese Laid-open Patent Publication No. 2015-86965 (JP2015-086965A), for example, the first rotor is connected to an engine and the second rotor is connected to a transmission through a clutch. Multiple springs are circumferentially disposed in housings formed inside the first rotor, seat members (spring seats) are deployed at opposite ends of every spring, and a part of the second rotor are further disposed between adjacent seat members. Therefore, torque of the first rotor is transmitted to the second rotor through the springs and seat members.

However, in the apparatus described in JP2015-086965A, large centrifugal force acts on the seat members during engine braking operation by shift-down or the like, so that the seat members are apt to stick on the peripheral surfaces of the housings of the first rotor. As a result, the seat members cannot follow movement of the second rotor, so that the seat members and second rotor separate, and when the seat members later make contact with the second rotor again, the apparatus is apt to incur an impact.

SUMMARY OF THE INVENTION

According to an aspect of the present invention, a torque transmission apparatus includes a first rotor, a second rotor, an elastic body, and a seat member. The torque transmission apparatus is configured to transmit torque generated by a power source to a driven unit. The first rotor is connected to one of the power source and the driven unit to rotate around an axial line. The second rotor faces the first rotor and is connected to the other of the power source and the driven unit to rotate relative to the first rotor around the axial line. The elastic body is provided in a torque transmission path between the first rotor and the second rotor to transmit torque from one of the first rotor and the second rotor to the other of the first rotor and the second rotor and to absorb torque fluctuation between the first rotor and the second rotor. The seat member is interposed between the elastic body and both the first and second rotors in the torque transmission path so as to be contactable with and separable from the first and second rotors. The first rotor includes a housing configured to accommodate the seat member in a circumferentially movable manner. The housing includes an outer circumferential surface configured to restrict the seat member from moving radially outward and a lateral end surface configured to restrict the seat member from moving circumferentially. The seat member includes an outer circumferential surface facing the outer circumferential surface of the housing, a holding portion holding the elastic body at one circumferential end face, and a contact surface contactable with the lateral end surface at the other circumferential end face. An angle of the seat member in a plane normal to the axial line, formed by the contact surface and a tangent to a circle centered on the axial line at an intersection between the contact surface and the outer circumferential surface of the seat member, is greater than 90°.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
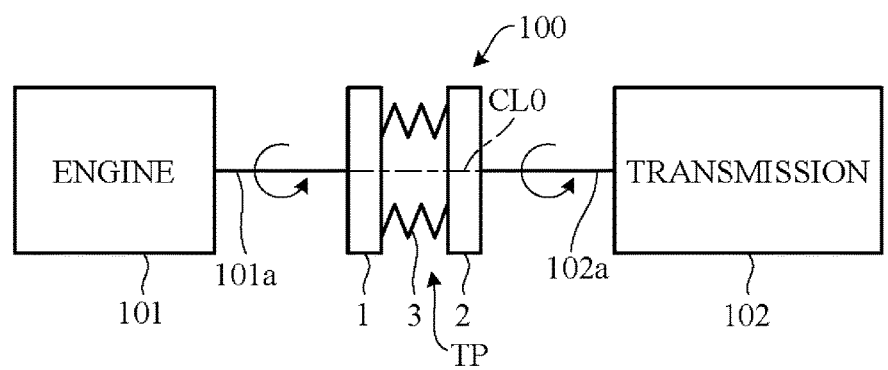
FIG. 1 is a diagram schematically illustrating an application example of a torque transmission apparatus according to an embodiment of the present invention.

An embodiment of the present invention is explained in the following with reference to FIGS. 1 to 12. FIG. 1 is a diagram schematically illustrating an application example of a torque transmission apparatus 100 according to an embodiment of the present invention. The torque transmission apparatus 100 is interposed in a power transmission path between an engine 101 and a transmission 102 mounted on a vehicle via or not via a clutch (not shown).

The torque transmission apparatus 100 has a first rotor 1 and second rotor 2 both installed to be rotatable around an axially extending center line (axial line) CL0, and springs 3 installed in a torque transmission path TP between the first rotor 1 and the second rotor 2. The first rotor 1 is connected to an output shaft (crankshaft) 101a of the engine 101, and the second rotor 2 is connected to an input shaft 102a of the transmission 102. Torque input to the first rotor 1 from the engine 101 is transmitted to the second rotor 2 through the springs 3. At this time, torque fluctuation between the first rotor 1 and the second rotor 2 is absorbed by expansion or contraction of the springs 3. As a result, transmission to the transmission 102 of vibration owing to rotational fluctuation of the engine 101 can be damped.

Figure 2:
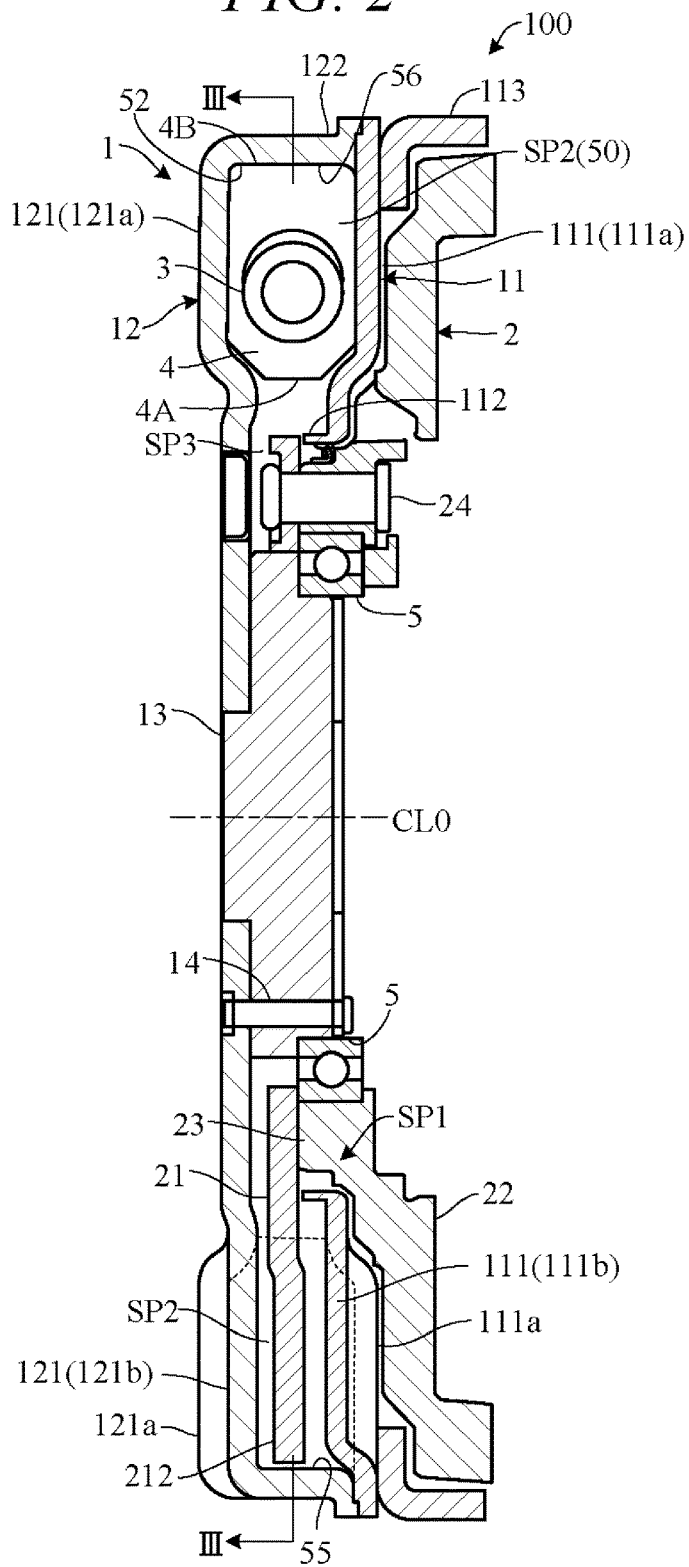
FIG. 2 is a cross-sectional diagram illustrating a main part configuration of the torque transmission apparatus according to the embodiment of the present invention.
Figure 3:
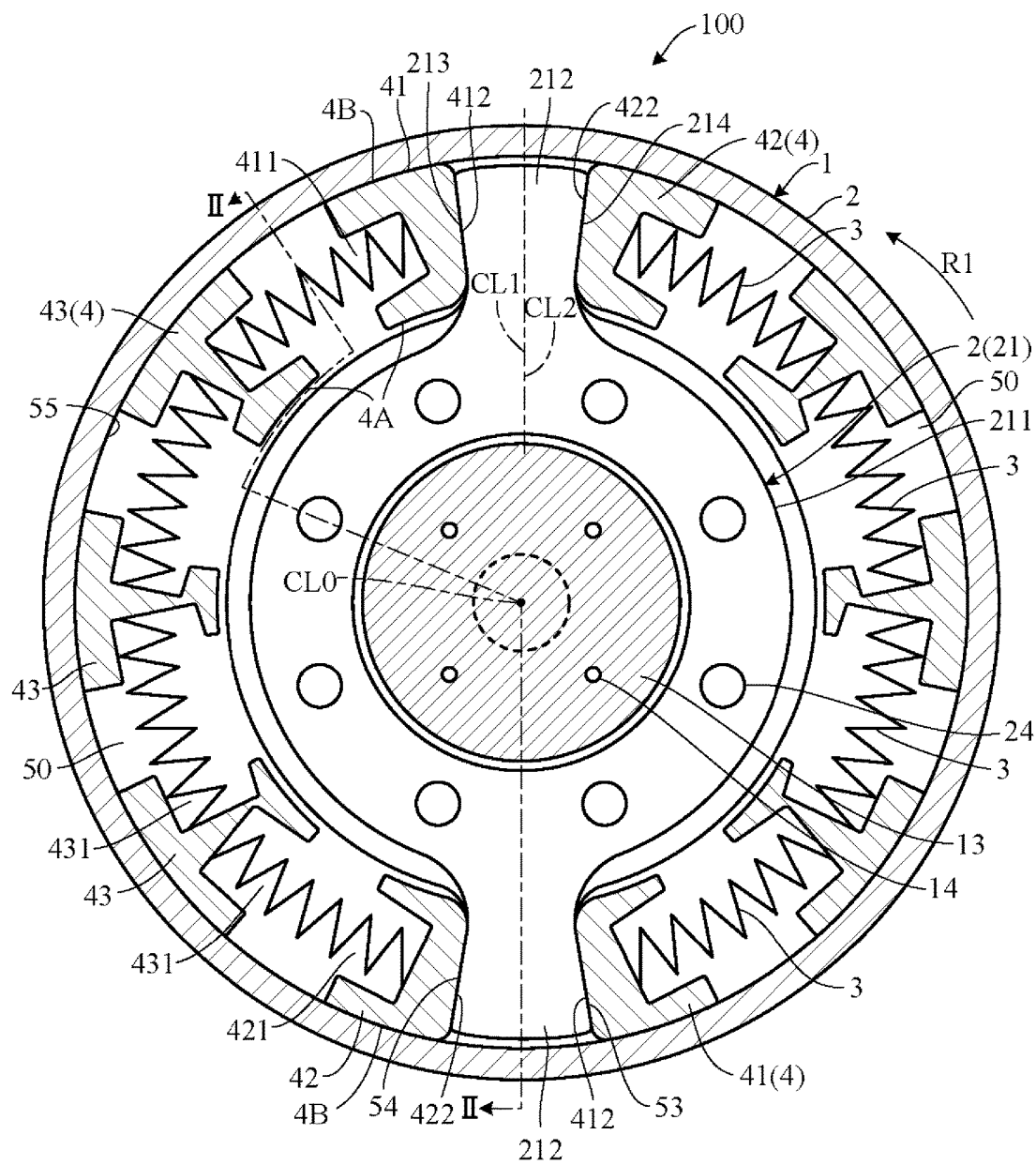
FIG. 3 is a cross-sectional diagram taken along line of FIG. 2.

FIG. 2 is a cross-sectional diagram (cross-sectional diagram taken along axial line CL0) illustrating a main part configuration of the torque transmission apparatus according to the embodiment of the present invention, and FIG. 3 is a cross-sectional diagram taken along line of FIG. 2 (diagram of cross-section taken orthogonal to axial line CL0). As viewed in FIG. 3, FIG. 2 corresponds to a sectional configuration taken along line II-II in the drawing. For convenience of explanation, a direction along the axial line CL0 as shown in FIG. 2 is defined as a forward-rearward direction, a direction radiating from the axial line CL0 is defined as a radial direction, and a direction along a circle centered on the axial line CL0 is defined as a circumferential direction. The structural components are explained in line with these definitions in the following.

As shown in FIGS. 2 and 3, the first rotor 1 integrally includes a front plate 11 and a rear plate 12, both of ring-like shape centered on the axial line CL0, and a center plate 13 of disk-like shape centered on the axial line CL0. As shown in FIG. 2, the rear plate 12 includes a radially extending side plate part 121 and a circular annular part 122 bent forward from an outer radial edge of the side plate part 121 to extend axially. An inner radial edge of the side plate part 121 is fastened to a rear face of the center plate 13 by multiple circumferentially spaced rivets 14.

The front plate 11 has a radially extending side plate part 111 and a circular annular part 112 bent rearward from an inner radial edge of the side plate part 111 to extend axially. An annular plate 113 of L-like sectional shape is joined to a front face of an outer radial edge of the side plate part 111 by welding or similar. An outer circumferential surface of the annular plate 113 is formed completely therearound with an unshown gear (ring gear) and torque from the engine 101 is input to the annular plate 113 through the gear.

A front edge region of the circular annular part 122 of the rear plate 12 is joined to the outer radial edge of the front plate 11 by welding or fastened thereto by bolts. At this time, a ring-like space SP1 is formed between an outer circumferential surface of the center plate 13 and an inner circumferential surface of the annular part 112 of the front plate 11, and a ring-like space SP2 whose outer circumferential side is covered by the circular annular part 122 is formed between the side plate part 111 of the front plate 11 and the side plate part 121 of the rear plate 12. The space SP1 and the space SP2 communicate with each other through a ring-like space SP3 between a rear edge portion of the annular part 112 of the front plate 11 and the side plate part 121 of the rear plate 12.

Figure 4:
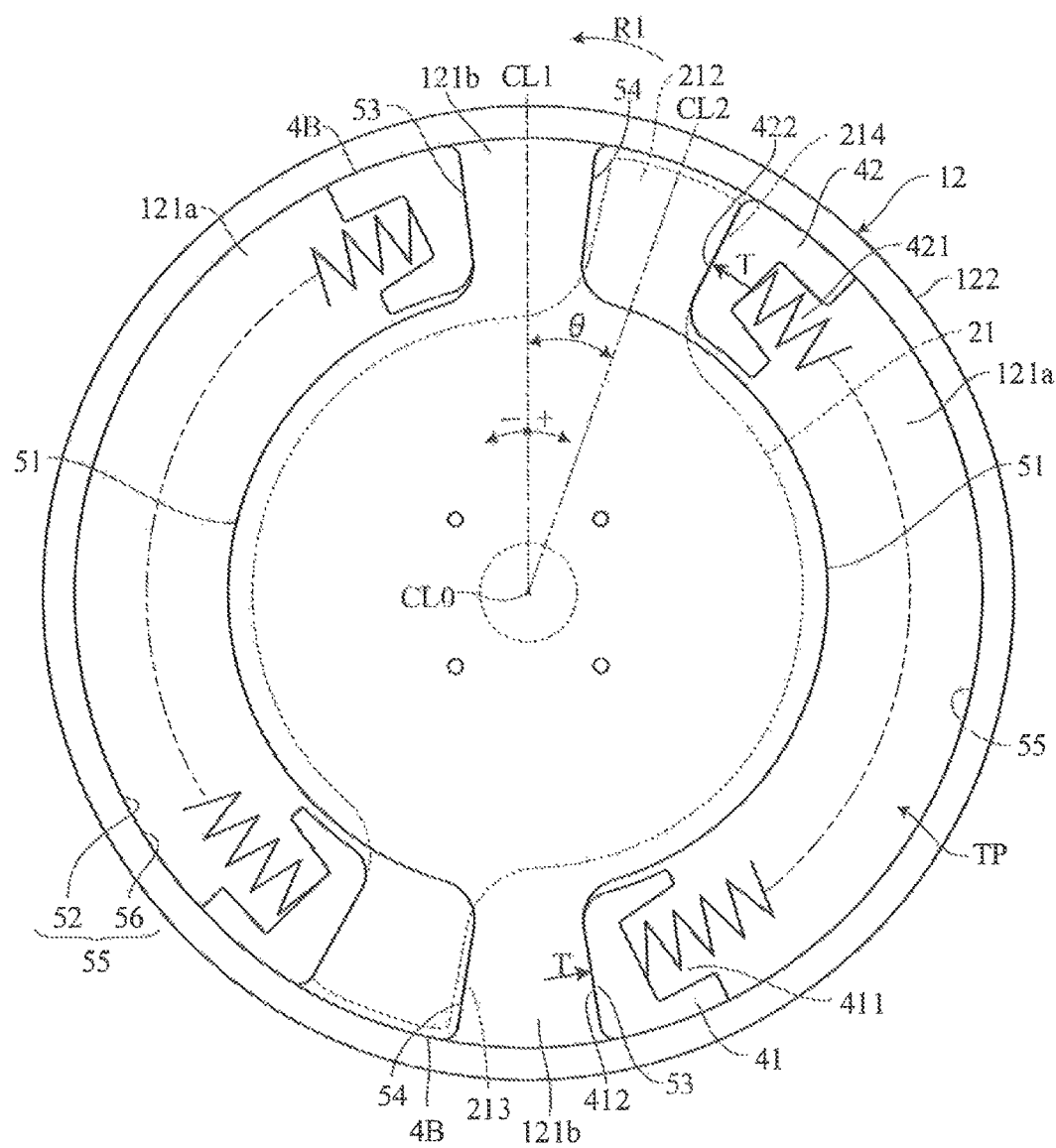
FIG. 4 is a plan diagram of the rear plate of the first rotor constituting the torque transmission apparatus of FIG. 2.

FIG. 4 is a plan diagram of the rear plate 12 (as seen from front). FIG. 4 also shows some of springs 3 and seat members 4 discussed later. In addition, an inner plate 21 of the second rotor 2 discussed later are indicated in dotted lines in FIG. 4. As shown in FIG. 4, similarly shaped depressions 121a are formed over equal intervals at two circumferential locations in a front face of the side plate part 121. The depressions 121a extend like arcs centered on the axial line CL0 and each includes a pair of facing circumferential surfaces 51 and 52 (inner circumferential surface 51 and outer circumferential surface 52), spaced a predetermined distance radially, and a pair of lateral end surfaces 53 and 54 connecting opposite circumferential ends of the pair of circumferential surfaces 51 and 52. The depressions 121a are formed, for example, by press-working that bulges the side plate part 121 rearward.

The outer circumferential surfaces 52 of the depressions 121a smoothly connect with inner circumferential surfaces 56 of the circular annular part 122 with no radial offset (see FIG. 2), and the circumferential surfaces 56 and 52 constitute outer circumferential surfaces 55 of housings 50. As explained further later, the housings 50 are spaces that accommodate the springs 3 and seat members 4 and parts of the space SP2 constitute the housings 50. Border regions 121b where the depressions 121a are absent are provided between the pair of depressions 121a. The border regions 121b have the sectional shape of the side plate part 111 before formation of the depressions 121a.

Like the rear plate 12, the front plate 11 is also formed with similarly shaped depressions 111a at two circumferential locations, and border regions 111b are formed between the pair of depressions 111a. Specifically, as shown in FIG. 2, the depressions 111a are formed on the rear face of the front plate 11 so as to oppose the depressions 121a of the rear plate 12 and the border regions 111b are formed at locations opposing the border regions 121b. Like the depressions 121a of the rear plate 12, the depressions 111a have inner circumferential surfaces and pairs of lateral end surfaces. Hereinafter, the inner circumferential surfaces and lateral end surfaces of the depressions 111a are assigned the same symbols as the inner circumferential surfaces 51 and lateral end surfaces 53 and 54 of the depressions 121a. The inner circumferential surfaces 51 and the lateral end surfaces 53 and 54 of the depressions 121a are formed at positions where the inner circumferential surfaces 51 and the lateral end surfaces 53 and 54 of the depressions 111a are extended in the axial direction. In other words, the inner circumferential surfaces 51 and lateral end surfaces 53 and 54 of the depressions 111a and the inner circumferential surfaces 51 and lateral end surfaces 53 and 54 of the depressions 112a are provided at corresponding positions in the circumferential and axial directions. The inner circumferential surfaces 51 and the lateral end surfaces 53 and 54 form the housings 50.

In the present embodiment, although the outer circumferential surfaces 52 of the depressions 121a of the rear plate 12 which continue to the inner circumferential surfaces 56 of the circular annular part 122 of the rear plate 12 are configured to constitute part of the outer circumferential surfaces 55 of the housings 50, it is alternatively possible to adopt a configuration in which the outer circumferential surfaces 52 are provided in the depressions 111a and these outer circumferential surfaces 52 constitute parts of the outer circumferential surfaces 55 of the housings 50.

As shown in FIG. 3, multiple (four in the drawing) springs 3 are installed in each housing 50. The springs 3 are, for example, straight coil springs held by seat members (spring seats) 4 at opposite longitudinal ends. The seat members 4 include first seat members 41 and second seat members 42 deployed at opposite circumferential ends of the housings 50 and multiple intermediate seat members 43 deployed between the first seat members 41 and second seat members 42. Relative to the rotation direction of the first rotor 1 driven by the engine 101 indicated by an arrow R1 in FIG. 3, the first seat members 41 are positioned in the housings 50 rearmost in the direction of rotation and the second seat members 42 are positioned in the housings 50 frontmost in the direction of rotation.

Opposite forward and rearward ends of the seat members 4 are installed in the depressions 111a and 121a. Holding portions 411 and 421 for holding the springs 3 are formed on circumferential one end surfaces of the first seat members 41 and the second seat members 42, and contact surfaces 412 and 422 contactable with the lateral end surfaces 53 and 54 of the depressions 111a and 121a are formed on circumferential other end surfaces thereof. At their forward and rearward middle portions, the contact surfaces 412 and 422 are contactable also with the second rotor 2 (projections 212 thereof described later). Holding portions 431 for holding the springs 3 are formed on opposite circumferential end surfaces of the intermediate seat members 43. The holding portions 411, 421 and 431 are, for example, formed as circular grooves corresponding to the outer shape of the springs 3.

The seat members 4 are accommodated to be movable in the circumferential direction and radial direction of the housings 50 (depressions 111a and 121a). The contact surfaces 412 of the first seat members 41 abut on the lateral end surfaces 53 of the depressions 111a and 121a or on one end surfaces of the projections 212 of the second rotor 2, whereby circumferential direction movement of each first seat member 41 to the direction opposite to R1 direction is restricted. The contact surfaces 422 of the second seat members 42 abut on the lateral end surfaces 54 of the depressions 111a and 121a or on the other end surfaces of the projections 212 of the second rotor 2, whereby circumferential direction movement of each second seat member 42 to the direction opposite to R1 direction is restricted.

The seat members 4 include inner circumferential surfaces 4A and outer circumferential surfaces 4B. The outer circumferential surfaces 4B are formed corresponding to the outer circumferential surfaces 55 of the housings 50, namely, are formed to have the same or substantially the same arcuate shape as the outer circumferential surfaces 55. The inner circumferential surfaces 4A of the seat members 4 abut on the inner circumferential surfaces 51 of the housings 50 (depressions 111a and 121a) or the outer circumferential surfaces 4B of the seat members 4 abut on the outer circumferential surfaces 55 of the housings 50, whereby radial movement of the seat members 4 is restricted.

The multiple springs 3 tandemly installed in the housings 50 via the intermediate seat members 43 can have either identical or different spring constants. For example, the spring constants of the middle two springs 3 among the four springs 3 in the circumferential direction can be made greater than the spring constants of the remaining two springs 3. Alternatively, the spring constants of the two springs 3 on the R1 arrow side can be made greater than the spring constants of the remaining two springs 3. Spring constant can be increased by, for example, enlarging the diameter of the spring 3. Spring constant can also be increased by adopting a dual-structure spring 3 having a small diameter spring located inside a large diameter spring.

As shown in FIG. 2, the second rotor 2 integrally includes the inner plate 21 located in the spaces SP2 and SP3 between the front plate 11 and the rear plate 12 of the first rotor 1 and a coupling plate 22 located in front of the front plate 11. An inner radial edge of the coupling plate 22 passes through the space SP1 between the front plate 11 and the center plate 13 to form a shaft portion 23 extending rearward, and this shaft portion 23 is fastened to an inner radial edge of the inner plate 21 by multiple rivets 24 deployed in the circumferential direction. The shaft portion 23 is rotatably supported on an outer circumferential portion of the center plate 13 of the first rotor 1 via a bearing 5, whereby the second rotor 2 can rotate relative to the first rotor 1.

As shown in FIG. 3, the inner plate 21 includes a ring portion 211 and the multiple (two in the drawing) circumferential direction projections 212 which project radially outward from an outer circumferential surface of the ring portion 211. As shown in FIG. 2 and FIG. 3, the ring portion 211 of the inner plate 21 contacts a rear end surface of the shaft portion 23. The projections 212 are each interposed between first and second seat members 41 and 42 circumferentially adjacent across border regions 111b and 121b. In this arrangement, as shown in FIG. 2, front surfaces of the projections 212 face rear surfaces of the border regions 111b of the front plate 11 across gaps, and rear surfaces of the projections 212 face front surfaces of the border regions 121b of the rear plate 12 across gaps.

As shown in FIG. 3, opposite circumferential direction end surfaces 213 and 214 of the projections 212 have shapes substantially the same those of the lateral end surfaces 53 and 54 of the depressions 111a and 121a. The end surfaces 213 and contact surfaces 412 of the first seat members 41, and the end surfaces 214 and contact surfaces 422 of the second seat members 42, can mutually abut at a forward-rearward middle portions of the seat members 4. A line extending radially through a circumferential middle of the border regions 111b and 121b of the first rotor 1 and orthogonally intersecting the axial line CL0 is defined as a first center line CL1, and a line extending radially through a circumferential middle of the projections 212 of the second rotor 2 and orthogonally intersecting the axial line CL0 is defined as a second center line CL2.

FIG. 3 shows an initial state in which no torque acts on the first rotor 1 and second rotor 2, in which the initial state, the first center line CL1 and the second center line CL2 coincide. Therefore, the angle between the first center line CL1 and the second center line CL2, i.e., a torsion angle θ of the second rotor 2 relative to the first rotor 1, is 0°.

Starting from this state, when torque T from the engine 101 is input through the annular plate 113 to the first rotor 1, such input torque T is applied from the lateral end surfaces 53 of the housings 50 to the contact surfaces 412 of the first seat members 41, as shown in FIG. 4. The torque T acting on the first seat members 41 is further applied from the contact surfaces 422 of the second seat members 42 to the end surfaces 214 of the projections 212 of the inner plate 21 through the springs 3, the intermediate seat members 43 and second seat members 42 which construct the torque transmission path TP. Therefore, the torque T acts on the second rotor 2 and the second rotor 2 rotates in R1 direction. The torque T acting on the second rotor 2 is output to the transmission 102 through, for example, a clutch installed so as to face the coupling plate 22.

At this time, the springs 3 of the housings 50 expand or contract according to the amplitude of the torque T, and the torsion angle θ of the second rotor 2 relative to the first rotor 1 varies with the expansion or contraction of the springs 3. Specifically, the torsion angle θ increases with increasing torque T. Thanks to the torsion angle θ changing in this manner, torque fluctuation of the first rotor 1 caused by rotational vibration (combustion oscillation) of the engine 101 can be absorbed and it is possible to stably rotate the second rotor 2.

As shown in FIG. 4, the torsion angle θ is positive when the amount of rotation of the first rotor 1 in R1 direction is greater than the amount of rotation of the second rotor 2. On the other hand, it is negative when the amount of rotation of the first rotor 1 in R1 direction is less than the amount of rotation of the second rotor 2. During ordinary driving, for example, the torsion angle θ is positive because torque acts from the first rotor 1 onto the second rotor 2. On the other hand, when torque acts from the second rotor 2 onto the first rotor 1, such as during rapid deceleration, the torsion angle θ is negative.

As also seen in FIG. 4, during ordinary driving, the opposite forward-rearward ends of the contact surfaces 412 of the first seat members 41 contact the lateral end surfaces 53 of the depressions 111a and 121a, and the forward-rearward middle portions thereof separate from the end surfaces 213 of the projections 212 of the second rotor 2. On the other hand, the opposite forward-rearward ends of the contact surfaces 422 of the second seat members 42 contact the end surfaces 214 of the projections 212 and the opposite forward-rearward ends thereof separate from the lateral end surfaces 54 of the depressions 111a and 121a.

Figure 5A:
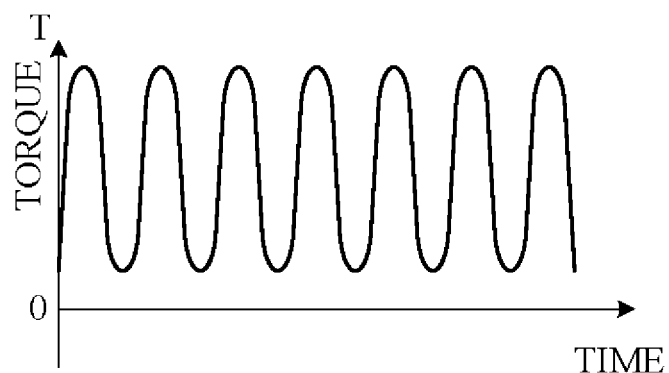
FIG. 5A is a diagram showing an change of torque acting on the second rotor with the lapse of time.
Figure 5B:
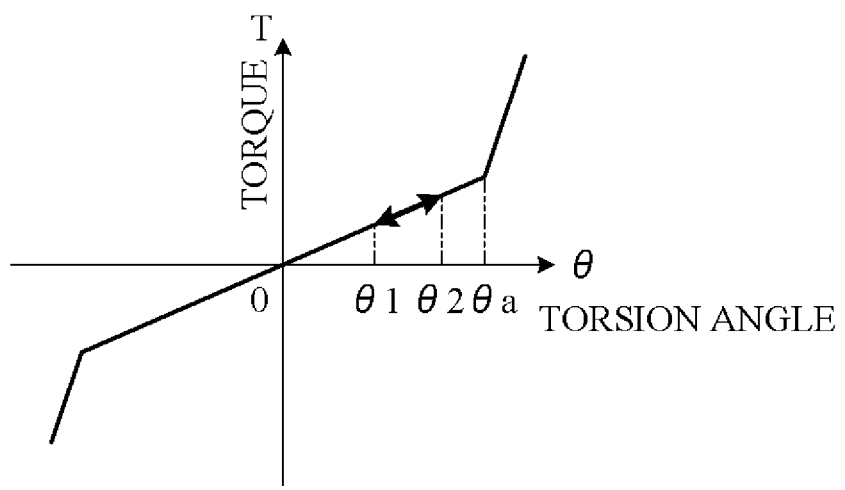
FIG. 5B is a diagram showing a relation between torsion angle of the second rotor relative to the first rotor and torque acting on the second rotor.

FIG. 5A is a diagram showing change of torque acting on the second rotor 2 with the lapse of time, and FIG. 5B is a diagram showing relation between torsion angle θ and torque T acting on the second rotor 2. FIG. 5B is a spring characteristic curve of the torque transmission apparatus 100, wherein torque T is seen to increase with increasing torsion angle θ. The slope of the characteristic curve (spring constant) is small in a region of torsion angle θ smaller than a determined value θa and increases when the torsion angle θ exceeds the determined value θa. When, as shown in FIG. 5A, torque T fluctuates in a range of T>0 owing to vibration (combustion oscillation or the like) of the engine 101, torsion angle θ varies in a range of, for example, θ1≤θ≤θ2, as shown in FIG. 5B. Therefore, torque fluctuation of the second rotor 2 can be reduced.

In this connection, when engine braking is activated by a shift-down, for example, large centrifugal force acts on the seat members 4 and the seat members 4 are liable to stick to the outer circumferential surfaces 55 of the housings 50 of the first rotor 1. In such a case, with the seat members 4 being unable to follow movement of the second rotor 2, the end surfaces 214 of the projections 212 of the second rotor 2 in the state of FIG. 4 separate from the contact surfaces 422 of the second seat members 42, whereafter the torque transmission apparatus 100 is liable to incur an impact when the projections 212 and second seat members 42 come into contact again. Upon occurrence of an impact shock in the torque transmission apparatus 100, misfire is apt to be falsely detected based on crankshaft rotation.

Figure 6A:
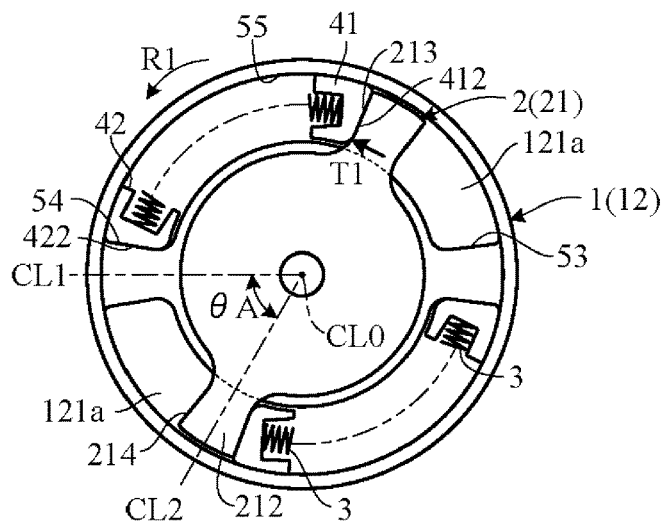
FIG. 6A is a first diagram for explaining change of the torsion angle of the second rotor relative to the first rotor.
Figure 6B:
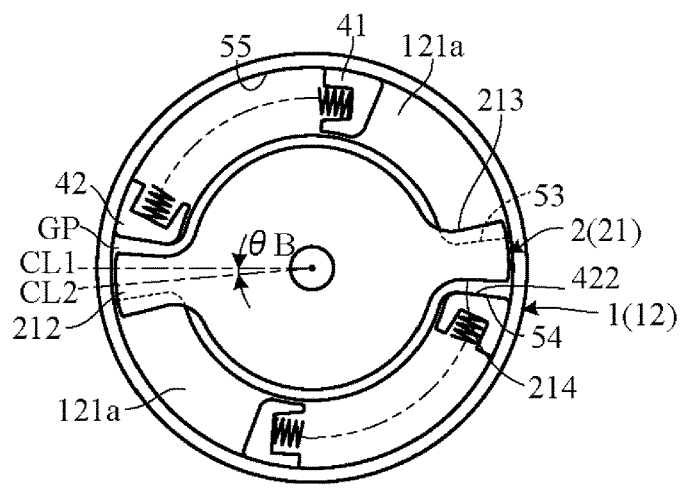
FIG. 6B is a second diagram for explaining change of the torsion angle of the second rotor relative to the first rotor.
Figure 6C:
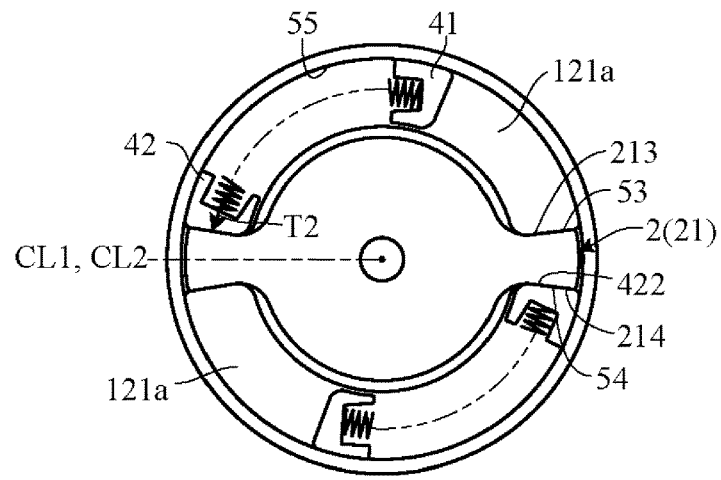
FIG. 6C is a third diagram for explaining change of the torsion angle of the second rotor relative to the first rotor.
Figure 7A:
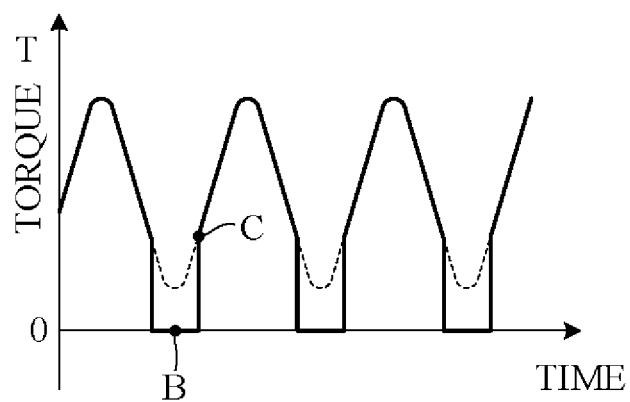
FIG. 7A is a diagram showing change of torque acting on the second rotor with the lapse of time when the torsion angle changes like FIGS. 6A to 6C.
Figure 7B:
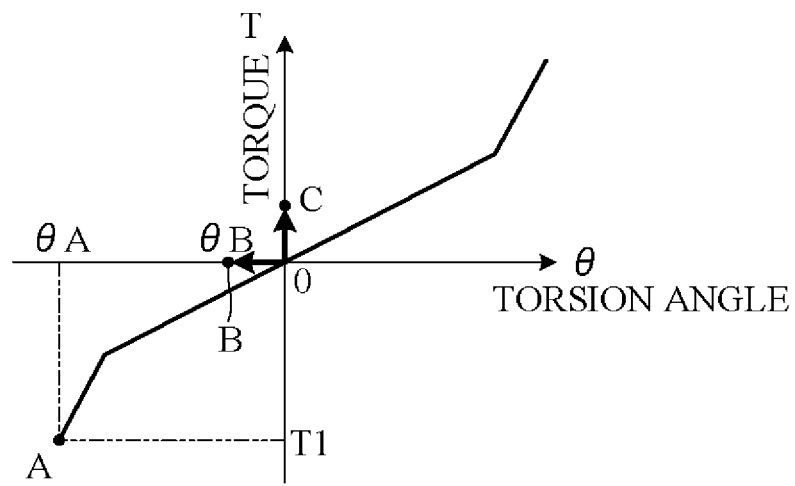
FIG. 7B is a diagram showing a relation between torsion angle of the second rotor relative to the first rotor and torque acting on the second rotor when the torsion angle changes like FIGS. 6A to 6C.

Elaboration of this point follows. FIG. 6A to FIG. 6C are respectively diagrams for explaining change of torsion angle θ of the second rotor 2 (inner plate 21) relative to the first rotor 1 (rear plate 12), and FIGS. 7A and 7B are respectively diagrams showing change of torque T acting on second rotor 2 with the lapse of time, and relation between torsion angle θ and torque T. In FIG. 6A to FIG. 6C, some springs 3 and seat members 4 are omitted for convenience.

FIG. 6A shows a state where the first rotor 1 is rapidly decelerated when engine braking is activated by a shift-down. At this time, the seat members 4 stick to the outer circumferential surfaces 55 of the housings 50 under centrifugal force of the seat members 4 caused by high-speed rotation of the first rotor 1 immediately after shift-down. Since the operation amount of an accelerator pedal is small (not operation, for example) at this time, the amount of rotation of the second rotor 2 in R1 direction is greater than the amount of rotation of the first rotor 1 in R1 direction. As a result, the end surfaces 213 of the projections 212 of the second rotor 2 contact the contact surfaces 412 of the first seat members 41 and torque T1 (pressing force) from the projections 212 toward R1 direction acts on the first seat members 41. In this case, the end surfaces 213 of the projections 212 function as torque transmission portions of the second rotor 2, and the contact surfaces 412 of the first seat members 41 function as torque receiving portions of the first rotor 1.

Torque T1 input to the first seat members 41 presses the seat members 4 onto the lateral end surface 54 sides of the housings 50 (depressions 111a and 121a) while sliding along the outer circumferential surfaces 55. As a result, the contact surfaces 422 of the second seat members 42 abut on the lateral end surfaces 54 of the housings 50, as shown in FIG. 6A. In addition, the springs 3 contract, causing end surfaces of seat members 4 adjacent in the circumferential direction to approach or abut one another, thus minimizing circumferential direction length from the contact surfaces 412 of the first seat members 41 to the contact surfaces 422 of the second seat members 42. At this time, as indicated at point A of FIG. 7B, for example, torsion angle θ becomes minimum torsion angle θA and torque T acting on the second rotor 2 becomes T1.

After that, when the accelerator pedal is depressed and the first rotor 1 accelerates, then, owing to the fact that the seat members 4 are stuck on the outer circumferential surfaces 55 of the housings 50, the end surfaces 213 of the projections 212 of the second rotor 2 separate from the first seat members 41, as shown in FIG. 6B. In addition, the end surfaces 214 of the projections 212 abutting on the lateral end surfaces 54 of the housings 50 approach the second seat members 42 and the torsion angle becomes θB (<0), a larger value than OA. At this time, the springs 3 are maximally contracted and the apparent spring constant, i.e. rigidity, of the springs 3 is high.

In the state shown in FIG. 6B, gaps GP are present between the second seat members 42 and the projections 212. Therefore, as indicated at point B in FIG. 7A, torque T acting on the second rotor 2 becomes 0 and the relation between torsion angle θ and torque T becomes, for example, as indicated at point B of FIG. 7B. When a torque change toward the positive side occurs on the side of the first rotor 1 from this state, torsion angle θ increases (approaches 0) while torque T stays at 0, as indicated in FIG. 7B.

As shown in FIG. 6C, upon further acceleration of the first rotor 1, the contact surfaces 422 of the second seat members 42 contact the end surfaces 214 of the projections 212 of the second rotor 2 and torque T2 acts on the second rotor 2. Specifically, as indicated at point C in FIG. 7A, torque T rapidly increases. At this time, torsion angle θ becomes 0 and does not increase beyond this value owing to the high rigidity of the springs 3 caused by the seat members 4 remaining stuck on the outer circumferential surfaces 55 of the housings 50. An impact therefore occurs in the torque transmission apparatus 100 because the springs 3 cannot absorb impact arising when the second seat members 42 and the projections 212 make contact. The relation between torsion angle θ and torque T in this case is represented at point C of FIG. 7B.

When rotation of the first rotor 1 thereafter fluctuates owing to rotational vibration of the engine 101, the first rotor 1 and second rotor 2 repeatedly perform the contact of FIG. 6C and separation of FIG. 6B. As a result, the relation between torsion angle θ and torque T varies along the arrows connecting point B, the origin and point C in FIG. 7B. Impact therefore repeatedly occurs in the torque transmission apparatus 100 and aggravates false misfire detection and the like.

This kind of phenomenon occurs not only in a case where the accelerator pedal is incrementally depressed after occurrence of engine braking by a shift-down or the like, as set out above, but also occurs, for example, in a case where the accelerator pedal is depressed to accelerate when merging into an expressway lane and accelerator depression is thereafter eased to a small accelerator depression angle after fully entering the expressway. In other words, it occurs in a low torque (small accelerator pedal depression angle) region when the seat members 4 are in an adhered state during shift-down, accelerating high-speed rotation, or similar. In order to preclude this kind of phenomenon, the torque transmission apparatus 100 is configured as set forth below in the present embodiment.

Figure 8:
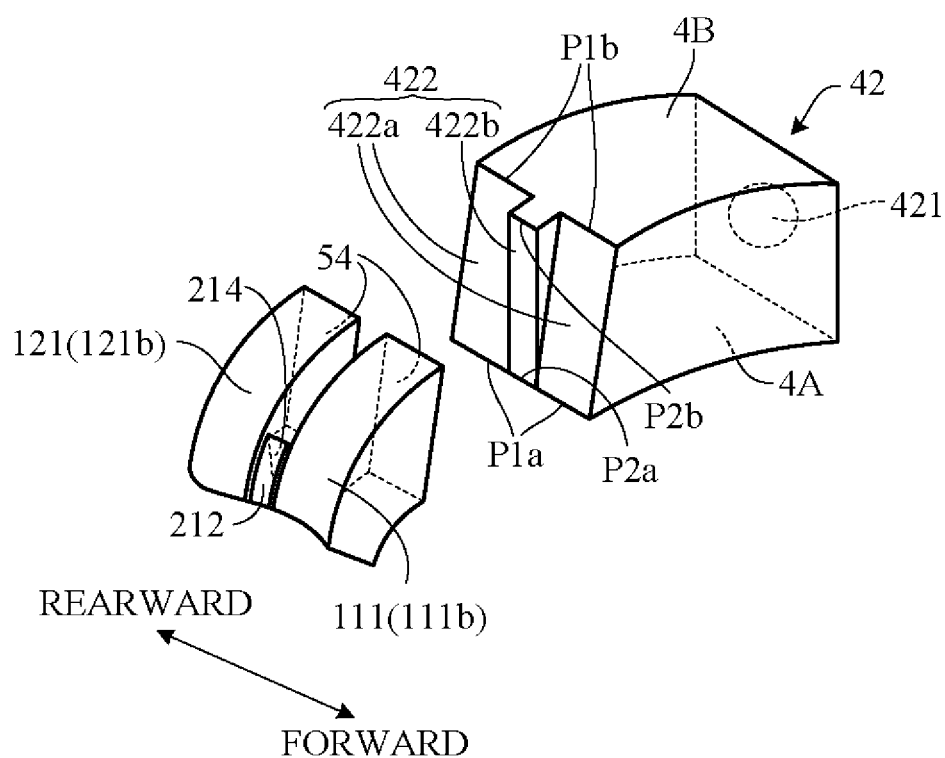
FIG. 8 is a perspective diagram showing a main part configuration of the torque transmission apparatus according the embodiment of the present invention.

FIG. 8 is a perspective diagram showing a main part configuration of the torque transmission apparatus 100 according the embodiment of the present invention. FIG. 8 shows the second seat member 42, the side plate parts 111 and 121 (border regions 111b and 121b) of the first rotor 1 facing the contact surface 422 of the second seat member 42, and the projection 212 of the second rotor 2.

As shown in FIG. 8, the end surface (contact surface) 422 of each second seat member 42 includes a first contact surface 422a which contacts the lateral end surfaces 54 of the housing (border regions 111b and 121b), and a second contact surface 422b which contacts the end surface 214 of the projection 212. The first contact surface 422a is present on a split forward-rearward end region of the contact surface 422, and the second contact surface 422b is present at a forward-rearward middle region of the contact surface 422. The first contact surface 422a and the second contact surface 422b are both flat and the circumferential positions of their inner peripheries (inner diameter side end portions) P1a and P2a coincide. On the other hand, the outer periphery (outer diameter side end portion) P2b of the second contact surface 422b projects farther circumferentially outward than the outer periphery P1b of the first contact surface 422a, and therefore the radial slopes of the first contact surface 422a and the second contact surface 422b are different.

The lateral end surfaces 54 of the border regions 111b and 121b are formed flat and to have the same slope as the first contact surface 422a, thereby enabling gapless contact with the first contact surface 422a. The end surface 214 of the projection 212 is formed flat and to have the same slope as the second contact surface 422b, thereby enabling gapless contact with the second contact surface 422b. Therefore, the radial slopes of the lateral end surfaces 54 and end surface 214 are different.

Figure 9:
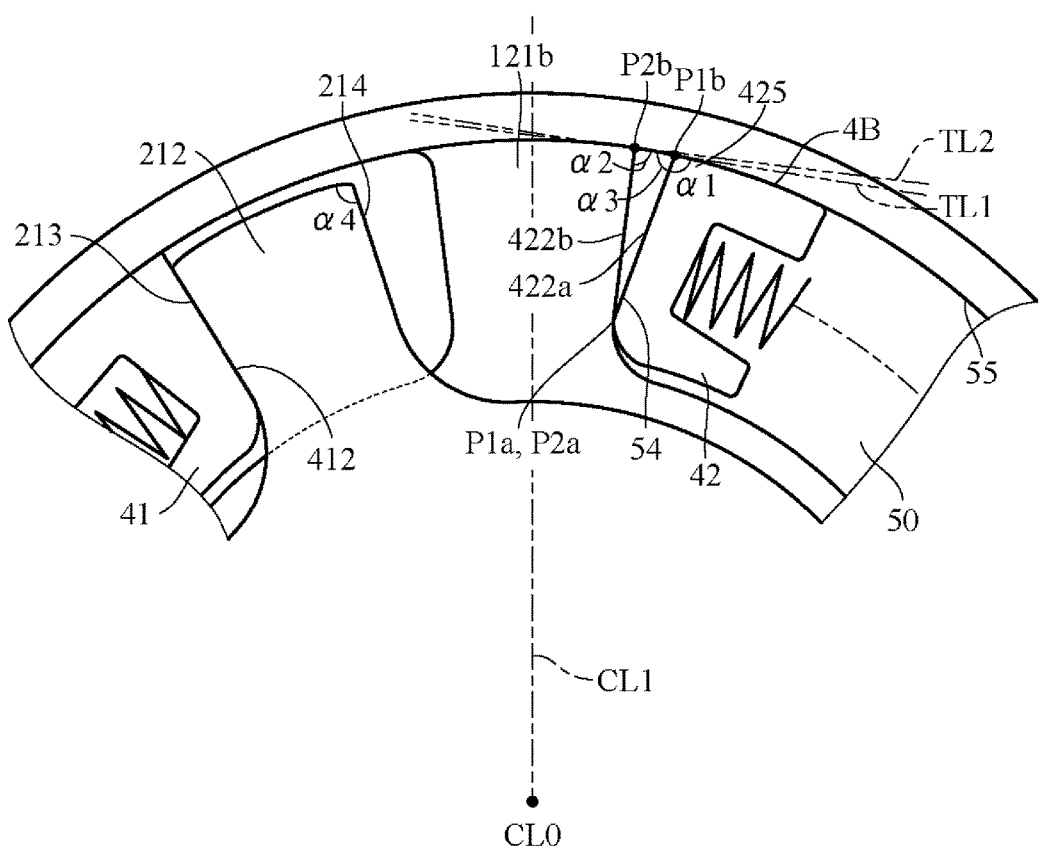
FIG. 9 is a plane diagram showing an enlarged view of the second seat member accommodated in the housing of the first rotor and the projection of the second rotor, constituting a part of the torque transmission apparatus according to the embodiment of the present invention.

FIG. 9 is a plane diagram showing an enlarged view of the second seat member 42 accommodated in the housing 50 of the first rotor 1 and the projection 212 of the second rotor 2 (plane diagram normal to the axial line CL0). Illustration of the front plate 11 is omitted in FIG. 9. FIG. 9 shows a state during rapid deceleration with the second seat member 42 having abutted the lateral end surface 54 of the housing 50 and the end surface 213 of the projection 212 having abutted the contact surface 412 of the associated first seat member 41.

As shown in FIG. 9, an angle α1 of the second seat member 42 between the first contact surface 422a and a tangent TL1 to a circle centered on axial line CL0 at an intersection (outer periphery P1b) between the first contact surface 422a and the outer circumferential surface 4B is designated a first angle of an outer diameter side end portion 425 of the second seat member 42. In addition, an angle α2 of the second seat member 42 between the second contact surface 422b and a tangent TL2 to a circle centered on axial line CL0 at an intersection (outer periphery P2b) between the second contact surface 422b and the outer circumferential surface 4B is designated a second angle of the outer diameter side end portion 425 of the second seat member 42.

In the present embodiment, the first contact surface 422a of the second seat member 42 is formed so that the first angle α1 of the second seat member 42 becomes greater than 90° and less than 180°, for example, so that α1 is in the range of 100° to 130°. Against this, the lateral end surface 54 of the housing 50 is formed so that an angle α3 between the lateral end surface 54 and a tangent to a circle centered on the axial line CL0 at the outer periphery thereof becomes 180°−α1.

On the other hand, the second contact surface 422b of the second seat member 42 is formed so that the second angle α2 of the second seat members 42 becomes smaller than the first angle α1, for example, so that α2 is in the range of 80° to 100°. Against this, the end surface 214 of the projection 212 is formed so that an angle α4 between the lateral end surface 214 and a tangent to a circle centered on the axial line CL0 at the outer periphery thereof is 180°−α2.

Characteristic operation of the torque transmission apparatus 100 in accordance with the present embodiment will be explained. In a state with the seat members 4 stuck to the outer circumferential surfaces 55 of the housings 50 by centrifugal force, when, for example, the first rotor 1 decelerates, the torsion angle θ becomes negative and the projections 212 of the second rotor 2 collide with the first seat members 41. Therefore, torque (pressing force) acts on the seat members 4 and, as shown in FIG. 10A, the seat members 4 are as a whole pushed in the rotation direction (R1 direction) and the contact surfaces 422 (first contact surfaces 422a) of the second seat members 42 abut the lateral end surfaces 54 of the housings 50.

Figure 10A:
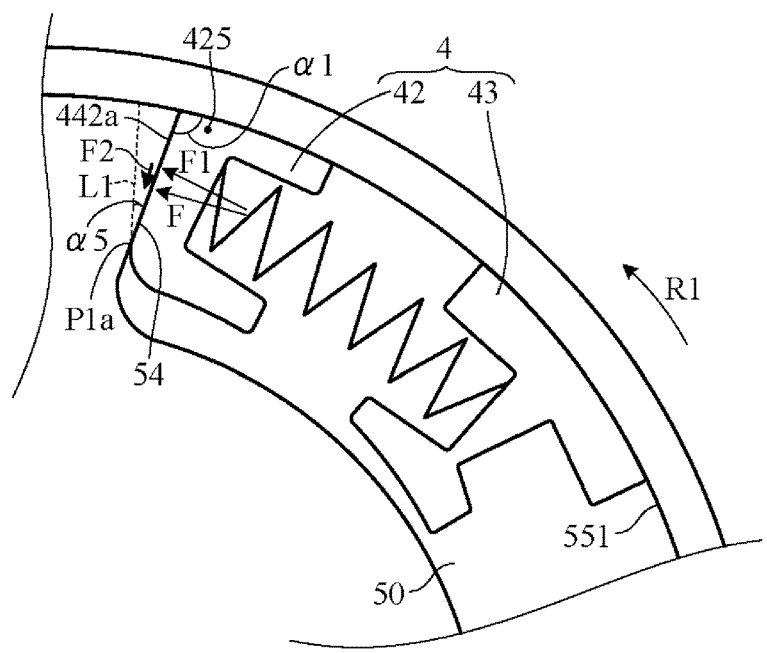
FIG. 10A is a diagram showing an example of an operation of the torque transmission apparatus according to the embodiment of the invention.

In FIG. 10A, a radial line extending from the axial line CL0 through the inner periphery P1a of the first contact surface 422a is represented as a dotted line L1. If an angle α5 between the first contact surface 422a and the dotted line L1 at this time is 0°, the first angle α1 of the end portion 425 of the second seat member 42 is 90°. In the present embodiment, since the first angle α1 is greater than at least 90°, the angle α5 becomes greater than 0°, and first angle α1 grows larger as the size of angle α5 increases.

In the state of FIG. 10A, a circumferential pressing force F produced by torque T from the second rotor 2 acts on the seat member 4. The pressing force F can be resolved into a perpendicular component of force F1 perpendicular to the first contact surface 422a and a parallel component of force F2 parallel to the first contact surface 422a, with the radially inwardly directed parallel component force F2 being small when the pressing force F is small. Therefore, since the parallel component force F2 cannot exceed the sum of the centrifugal force of the second seat member 42 and the frictional force at the first contact surface 422a, the second seat member 42 does not move radially inward.

However, when the pressing force F is small, contraction of the spring 3 is small, and thus rigidity of the spring 3 is relatively low. Therefore, the spring 3 can be contracted while sliding the seat member 4 along the outer circumferential surface 55 of the housing 50. As a result, it is possible to make the seat member 4 follow movement of the second rotor 2, and thus the torque transmission apparatus 100 is enabled to achieve good vibration absorption performance.

Figure 10B:
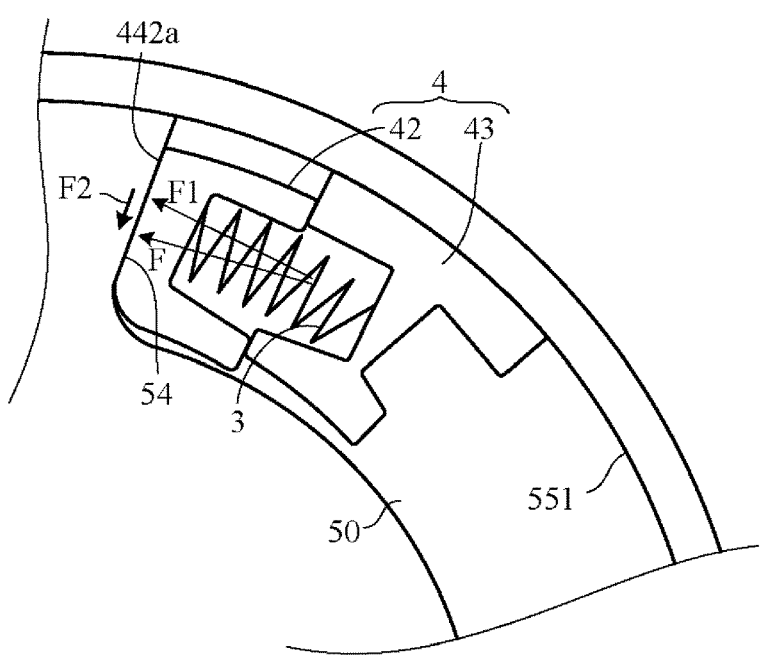
FIG. 10B is a diagram showing an example of an operation following the operation of FIG. 10A.
Figure 11:
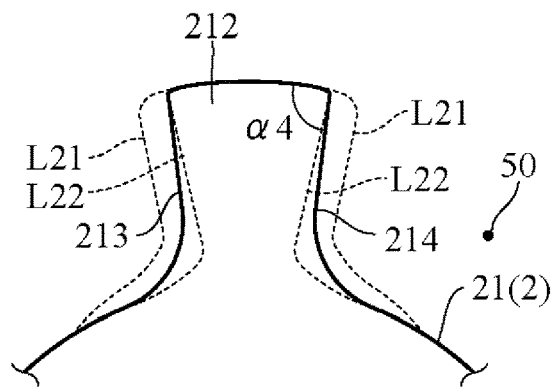
FIG. 11 is a diagram for explaining a shape of the second rotor constituting a part of the torque transmission apparatus according to the embodiment of the present invention.

On the other hand, when torque T acting on the seat member 4 reaches or exceeds a predetermined level by activating engine braking, for example, the end surfaces of adjacent seat members 4 (42 and 43) collide, as shown in FIG. 10B, and contraction of the springs 3 becomes maximum. At this time, pressing force F at the first contact surface 422a of the second seat member 42 increases and the parallel component of force F2 toward the radially inward side increases. As a result, the parallel component of force F2 exceeds the sum of the centrifugal force of the second seat member 42 and the frictional force at the first contact surface 422a, and the second seat member 42 moves radially inward along the lateral end surface 54 of the housings 50.

Therefore, the second seat member 42 can be separated from the outer circumferential surface 55 of the housing 50 and sticking of the second seat member 42 on the outer circumferential surface 55 at the time of engine braking can be prevented. The prevention of seat member 4 sticking makes it easy for the seat member 4 to move circumferentially. Therefore, it is possible to make the seat member 4 follow movement of the second rotor 2, whereby the torque transmission apparatus 100 is able to achieve enhanced vibration absorption performance.

According to the embodiment, the following operations and effects can be achieved:

(1) The torque transmission apparatus 100 transmits torque generated by, for example, the engine 101 to the transmission 102 (FIG. 1). This torque transmission apparatus 100, includes the first rotor 1 connected to the engine 101 (the output shaft 101a) to rotate around the axial line CL0, the second rotor 2 facing the first rotor 1 and connected to the transmission 102 (the input shaft 102a) to rotate around the axial line CL0, the springs 3 provided in the torque transmission path TP between and the first rotor 1 and the second rotor 2 to transmit torque from one of the first rotor 1 and second rotor 2 to the other of the first rotor 1 and the second rotor 2 and to absorb torque fluctuation between the first rotor 1 and the second rotor 2, and the seat members 4 interposed between the springs 3 and both the first and second rotors 1 and 2 in the torque transmission path TP so as to be contactable with and separable from the first and second rotors 1 and 2 (FIGS. 2 and 3). The first rotor 1 includes the housings 50 for accommodating the seat members 4 in the circumferentially movable manner, and the housings 50 includes the outer circumferential surfaces 55 which restrict the seat members 4 from moving radially outward and the lateral end surfaces 53 and 54 which restrict the seat members 4 from moving circumferentially (FIG. 4). The seat members (second seat members 42) includes the outer circumferential surfaces 4B which face the outer circumferential surfaces 55 of the housings 50, the holding portions 421 which hold the springs 3 at one circumferential end face, and the contact surfaces 422 contactable with the lateral end surfaces 54 and the second rotor 2 (projections 212) at the other circumferential end face (FIG. 4). Moreover, the contact surface 422 (first contact surface 422a) is formed so that the angle of the outer end portion 425 of the second seat member 42 in the plane normal to the axial line CL0, the first angle $\alpha 1$ of the second seat member 42 defined as the angle between the first contact surface 422a and the tangent TL1 to the circle centered on the axial line CL0 at the intersection (the outer periphery P1b) between the first contact surface 422a and the outer circumferential surface 4B of the second seat member 42, is greater than 90° (FIG. 9).

Since the first contact surface 422a of the second seat member 42 is formed so that the first angle $\alpha 1$ of the outer circumferential side end portion 425 of the second seat member 42 is greater than 90°, a component of the pressing force F acting circumferentially on the first contact surface 422a is directed radially inward, whereby the second seat member 42 can be moved radially inward. As a result, sticking of the seat members 4 to outer circumferential surfaces 55 of the housings 50 can be prevented, thus making it possible to prevent an impact from occurring owing to collision of the seat members 4 and the second rotor 2 at the time of, for instance, engine braking activated by a shift-down or the like.

(2) The contact surfaces 422 of the second seat members 42 includes the first contact surfaces 422a contactable with the lateral end surfaces 54 of the housings 50 and the second contact surfaces 422b contactable with end faces 214 of the projections 212 of the second rotor 2 (FIG. 8). The first contact surface 422a is formed so that the first angle $\alpha 1$ of the end portion 425 of the second seat member 42 in the plane normal to the axial line CL0, defined as the angle between the first contact surface 422a and the tangent (first tangent) TL1 to the circle centered on the axial line CL0 at the intersection (the outer periphery P1b) between the first contact surface 422a and the outer circumferential surface 4B of the second seat member 42, is greater than 90°, and the second contact surface 422b is formed so that the second angle $\alpha 2$ of the end portion 425 of the second seat member 42 in the plane normal to the axial line CL0, defined as the angle between the second contact surface 422b and the tangent (second tangent) TL2 to the circle centered on the axial line CL0 at the intersection (the outer periphery P2b) between the second contact surface 422b and the outer circumferential surface 4B of the second seat member 42, is smaller than the first angle $\alpha 1$ (FIG. 9).

Therefore, adequate strength can be ensured at the projections 212 of the inner plate 21 of the second rotor 2, while also securing sufficient volume of the housings 50. Specifically, as shown by dotted line L21 in FIG. 11, if the end surfaces 213 and 214 of the projection 212 are inclined from their inner radial edges at the same angle as the first contact surface 422a, the volume of the housings 50 decreases. As a result, space available for the springs 3 is reduced, and vibration absorption performance declines. Further, as shown by dotted line L22 in FIG. 11, if the end surfaces 213 and 214 of the projection 212 are inclined from their outer radial edges at the same angle as the first contact surface 422a, stress at a root region of the projection 212 increases and durability declines in proportion. In contrast, since the second angle $\alpha 2$ of the seat member end portion 425 is smaller than the first angle $\alpha 1$ of the seat member end portion 425 in the present embodiment, the angle $\alpha 4$ of the outer radial corner of the projection 212 can be enlarged, whereby durability of the projection 212 can be ensured while securing space for installing the springs 3.

(3) Each second contact surface 422b is formed at the forward-rearward middle portion of the associated contact surface 422, and each first contact surface 422a is formed as a pair of surfaces split between the forward and rearward sides, i.e., on opposite sides, of the second contact surface 422b (FIG. 8). Therefore, the inner plate 21 can be disposed in accordance with the second contact surfaces 422b to be rotatable with respect to the first rotor 1 at a forward-rearward middle portion of the housing 50. Behavior of the seat member 4 is therefore stabilized by force acting on the forward-rearward middle portion or the opposite forward-rearward ends of the seat members 4.

(4) The circumferential positions of the inner periphery P1a (inner diameter side end) of each first contact surface 422a and the inner periphery P2a (inner diameter side end) of the associated second contact surface 422b are the same, while the outer periphery P2b (outer diameter side end) of each first contact surface 422a projects farther circumferentially outward than the outer periphery P1b (outer diameter side end) of the associated second contact surface 422b (FIG. 8). Therefore, the second angle α2 of the outer diameter side end portion 425 of the second seat member 42 defined by the second contact surface 422b can be made smaller than the first angle α1 defined by the first contact surface 422a.

(5) The seat members 4 include the first seat member 41 installed at one circumferential end of each housing 50 so that torque T from the first rotor 1 is input to the first seat member 41, and the second seat member 42 installed at the other circumferential end of each housing 50 so that the torque T input to the first seat member 41 is output to the second rotor 2 through the springs 3 (FIG. 3). Further, each contact surface 422 of the second rotor 2 is formed so that the angle α1 of the end portion 425 of the second seat member 42 at the intersection (outer periphery P1b) between the contact surface 422 and the outer circumferential surface 4B of the second seat member 42 is greater than 90° (FIG. 9). Therefore, after engine braking is activated by a shift-down or the like, in a low torque (small accelerator pedal depression angle) region, it is possible to inhibit occurrence of impact owing to repeated contact between the second seat members 42 and the projections 212 caused by rotational vibration of the engine 101.

(6) The first rotor 1 includes the pair of housings 50 deployed circumferentially adjacent across the border regions 121b and 122b (FIG. 3). The second rotor 2 includes the projections 212 each deployed in a radially projecting manner between the first seat member 41 deployed in one of the pair of housings 50 and the second seat member 42 deployed in the other (FIG. 3). As a result, it is possible by a simple structure to input torque from the second seat members 42 through the one end surfaces 214 of the projections 212 to the second rotor 2, and during deceleration to input torque from the second rotor 2 through the other end surfaces 213 of the projections 212 to the first seat members 41.

(7) The torque transmission apparatus 100 further comprises the intermediate seat members 43 deployed between the first seat member 41 and second seat member 42 pair in each housing 50. And the multiple springs 3 are installed tandemly via the interposed intermediate seat members 43 in the housing 50 (FIG. 3). This makes straight springs 3 usable in the arcuate housings 50. Therefore, it is not necessary to use curved springs 3, cost can be lowered while ensuring stable spring performance.

(8) The torque transmission apparatus 100 uses straight coil springs (FIG. 8). Therefore, the configuration of the spring 3 can be simplified to configure a low-cost torque transmission apparatus 100.

MODIFICATIONS

Various modifications of the embodiment described above are possible. Some of these are explained in the following.

In the above embodiment, the contact surface 422 of each second seat member 42 is provided with the first contact surface 422a formed so as to make the first angle α1 of the end portion 425 of the second seat member 42 greater than 90° and with the second contact surface 422b formed so as to make the second angle α2 of the end portion 425 of the second seat member 42 smaller than the first angle α1. However, insofar as at least the angle of the end portion 425 of the second seat member 42 represented by first angle α1 is greater than 90°, the value of the second angle α2 is not limited as indicated above. For example, the second angle α2 can be the same as the first angle α1. In other words, the first contact surface 422a and the second contact surface 422b can be formed without a level difference.

Figure 12:
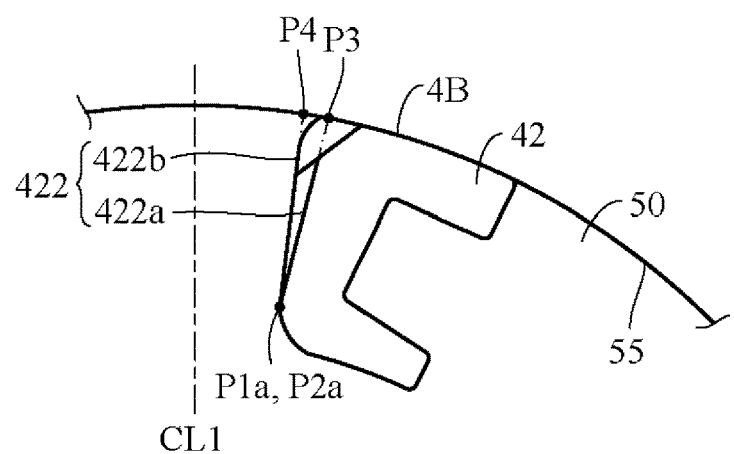
FIG. 12 is a diagram showing a modification of the second seat member constituting a part of the torque transmission apparatus according to the embodiment of the present invention.

In the above embodiment, although the contact surfaces 422 which contact the lateral end surfaces 54 of the housings 50 or the end surfaces 214 of the second rotor 2 are formed over the entire radial length of the end surfaces of the second seat members 42, they can alternatively be formed over only part of the radial length. Moreover, although the outer circumferential surfaces 4B which contact the outer circumferential surfaces 55 of the housings 50 are similarly formed over the entire circumferential length, they can alternatively be formed over only part of the circumferential length. For example, as shown in FIG. 12, the outer radial corner of the end face of the second seat member 42 can be chamfered to cut away part of the outer circumferential surface 4B and form the contact surface 422 at part of the end surface. In this case, it suffices to specify the first angle α1 and second angle α2, taking intersections P3, P4 of planes including the contact surfaces 422a, 422b and a circumferential plane including the outer circumferential surface 4B as intersections of the contact surfaces 422a, 422b and the outer circumferential surface 4B.

Specifically, the first angle α1 and second angle α2 of the end portion 425 of the seat member 42 are defined by angles between a tangent to a circle centered on the axial line CL0 and the contact surfaces 422a, 422b at intersections between the contact surfaces 422a, 422b or imaginary surfaces obtained by extending the contact surfaces 422a, 422b and the outer circumferential surface 4B of the seat member 42 or an imaginary circumferential surface obtained by extending the outer circumferential surface 4B, in a state of the outer circumferential surface 4B of the seat member 42 being abutted on the outer circumferential surface 55 of the housing 50. In other words, the first angle α1 and the second angle α2 can be defined by the contact surface 422 and the outer circumferential surfaces 4B in the plane normal to the axial line CL0. In particular, the first angle α1 corresponds to the angle between the first contact surface 422a and the outer circumferential surface 4B of the seat member 42, and the second angle α2 corresponds to the angle between the second contact surface 422b and the outer circumferential surface 4B of the seat member 42.

As shown in FIG. 9, when the first angle α1 of the end portion 425 of the second seat member 42 is greater than 90°, the inner periphery P1a of the contact surface 422a is positioned more toward the circumferential outer side (first center line CL1 side) than the outer periphery P1b. Therefore, the first contact surface 422a can be formed so that the inner periphery P1a projects more toward the circumferential outer side than the outer periphery P1b. More specifically, the contact surface 422 can be of any configuration insofar as the contact surface 422 is formed to incline with respect to an imaginary line extending radially from the axial line CL0 (L1 in FIG. 10A) such that when the second seat member 42 is pushed onto the lateral end surface 54 of the housing 50, the component force F2 of the pressing force F acts toward the radially inward side.

Such inclined contact surfaces can be provided not only on the second seat members 42 but also as the contact surfaces of the first seat members 41. In other words, the end surfaces of both of each pair of seat members 41 and 42 can be formed as inclined contact surfaces. The formation of the end surface of the first seat member 41 as an inclined contact surface results in a component of force acting on the first seat member 41 toward the radially inward side at the time the projection 212 of the second rotor 2 contacts the first seat member 41, thereby preventing the first seat member 41 from sticking to the outer circumferential surface 55 of the housing 50.

In the above embodiment, although the first rotor 1 is connected to the engine 101 and the second rotor 2 is connected to the transmission 102, a reverse arrangement having the first rotor 1 connected to the transmission 102 and the second rotor 2 connected to the engine 101 is also feasible. Although in the foregoing embodiment the springs 3 (coil springs) are interposed between the first rotor 1 and the second rotor 2 and torque is transmitted through the springs 3, the elastic body configuration can be of any type insofar as it is deployed in the torque transmission path TP between the first rotor 1 and the second rotor 2 and while transmitting torque from one to the other of the first rotor 1 and the second rotor 2 and also absorbing torque fluctuation between the first rotor 1 and the second rotor 2.

Although multiple seat members 4 are deployed in the housings 50 in the above embodiment, the number of the seat members 4 is not limited to that stated above insofar as they are installed among the springs 3, first rotor 1 and the second rotor 2 to enable contact and separation with respect to the first rotor 1 and the second rotor 2. For example, the intermediate seat members 43 can be omitted. Therefore, it suffices to install a single spring 3 between the first seat member 41 and the second seat member 42 in each housing 50. In the above embodiment, the torque transmission path TP between the first rotor 1 and the second rotor 2 is configured by the seat members 4 and the springs 3. Specifically, a configuration is adopted wherein when torque from the first rotor 1 acts on the second rotor 2, torque from the contact surfaces (torque transmission portions) 422 of the second seat members 42 acts on end surfaces (torque receiving portions) 214 of the projections 212 of the second rotor 2, and when torque from the second rotor 2 acts on the first rotor 1, torque from the end surfaces 213 (torque transmission portions) of the projections 212 acts on the contact surfaces (torque receiving portions) 412 of the first seat members 41. However, the torque transmission path TP is not limited to this configuration.

Although in the above embodiment the depressions 111*a* and 121*a* are provided in the front plate 11 and the rear plate 12, respectively, of the first rotor 1 and the housings 50 are configured by the depressions 111*a* and 121*a*, the housings 50 can be of any configuration insofar as the outer circumferential surfaces 55 restricting radially outward movement of the seat members 4 and the paired lateral end surfaces 54 restricting circumferential movement of the seat members 4 are present. For example, the housings 50 can be configured solely by the front plate 11. Although the holding portions 411, 421 and 431 of the springs 3 which are one example of elastic bodies are provided in the seat members 4 in the above embodiment, the shape of the seat members 4 can be modified variously in accordance with the shape of the elastic bodies. Therefore, the configuration of the seat member 4 (particularly the second seat member 42) is not limited to that stated above. More specifically, the seat member 4 can be of any configuration insofar as it has the outer circumferential surface 4B facing the outer circumferential surface 55 of the associated housing 50, has the holding portion 421 on a circumferential one end surface for holding the spring 3, and has the contact surface 422 provided on the circumferential other end surface to be capable of surface contact with the lateral end surface 54 of the housing 50.

Although the housings 50 are provided in the first rotor 1 at two circumferential locations in the above embodiment, the number of housings is not limited to two. For example, the housings 50 can be provided at three or more circumferential locations and the projections 212 be provided in a corresponding number. In the above embodiment, although the second rotor 2 includes the inner plate 21 and the coupling plate 22, and the projections 212 serving as the torque transmission portions of the second rotor 2 are positioned between the first seat members 41 and the second seat members 42 respectively deployed adjacently across the border regions 111*b* and 121*b* of the pair of housings 50, second rotor 2 is not limited to aforesaid configuration. For example, the projections 212 can be projected radially inward from an inner circumferential surface of a ring-shaped plate.

In the above embodiment, although the engine 101 mounted on a vehicle is used as the power source, the power source is not limited to a vehicle engine. Further, the driven unit which is driven by the torque generated by the power source can be one other than the transmission 102. In other words, the torque transmission apparatus of the present invention can be applied to various torque transmission paths for transmitting torque generated by a power source to a driven unit. The torque transmission apparatus of the present invention can be applied to other than vehicles.

The above embodiment can be combined as desired with one or more of the aforesaid modifications. The modifications can also be combined with one another.

According to the present invention, since the contact surface of the seat member is formed to make the angle of the outer circumferential end portion of the seat member greater than 90°, a component of pressing force acting circumferentially on the contact surface acts radially inward. As a result, the seat members can be moved radially inward, thus making it possible to prevent an impact from occurring owing to collision of the seat members and the second rotor at the time of, for instance, engine braking activated by a shift-down or the like.

Above, while the present invention has been described with reference to the preferred embodiments thereof, it will be understood, by those skilled in the art, that various changes and modifications may be made thereto without departing from the scope of the appended claims.

What is claimed is:

1. A torque transmission apparatus configured to transmit torque generated by a power source to a driven unit, comprising:
   a first rotor connected to one of the power source and the driven unit to rotate around an axial line;
   a second rotor facing the first rotor and connected to the other of the power source and the driven unit to rotate relative to the first rotor around the axial line;
   an elastic body provided in a torque transmission path between the first rotor and the second rotor to transmit torque from one of the first rotor and the second rotor to the other of the first rotor and the second rotor and to absorb torque fluctuation between the first rotor and the second rotor; and a seat member interposed between the elastic body and both the first and second rotors in the torque transmission path so as to be contactable with and separable from the first and second rotors, wherein the first rotor includes a housing configured to accommodate the seat member in a circumferentially movable manner, the housing including an outer circumferential surface configured to restrict the seat member from moving radially outward and a lateral end surface configured to restrict the seat member from moving circumferentially, the seat member includes an outer circumferential surface facing the outer circumferential surface of the housing, a holding portion holding the elastic body at one circumferential end face, and a contact surface contactable with the lateral end surface at the other circumferential end face, the second rotor includes an end surface facing the contact surface of the seat member, the contact surface includes a first contact surface contactable with the lateral end surface of the housing and a second contact surface contactable with the end surface of the second rotor, a first angle of the seat member in a plane normal to the axial line, formed by the first contact surface and a first tangent to a circle centered on the axial line at an intersection between the first contact surface and the outer circumferential surface of the seat member, is greater than 90°, and a second angle of the seat member in a plane normal to the axial line, formed by the second contact surface and a second tangent to a circle centered on the axial line at an intersection between the second contact surface and the outer circumferential surface of the seat member, is smaller than the first angle.

2. The apparatus according to claim 1, wherein a pair of the first contact surfaces are formed on opposite sides of the second contact surface in the axial direction.

3. The apparatus according to claim 1, wherein a circumferential position of an inner diameter side end of the first contact surface is the same as a circumferential position of an inner diameter side end of the second contact surface, and an outer diameter side end of the second contact surface projects circumferentially outward with respect to an outer diameter side end of the first contact surface.

4. The apparatus according to claim 1, wherein the first rotor is connected to the power source, and the second rotor is connected to the driven unit, and the seat member includes a first seat member installed at one circumferential end of the housing so that torque from the first rotor is input to the first seat member, and a second seat member installed at the other circumferential end of the housing so that the torque input to the first seat member is output to the second rotor through the elastic body.

5. The apparatus according to claim 4, further comprising an intermediate seat member deployed between the first seat member and the second seat member in the housing, wherein multiple elastic bodies are tandemly arranged through the intermediate seat member in the housing.

6. The apparatus according to claim 5, wherein the elastic bodies are comprised of straight coil springs.

7. The apparatus according to claim 1, wherein the first rotor includes a pair of the housings deployed circumferentially, the seat member includes a first seat member deployed in one of the pair of housings, and a second seat member deployed in the other of the pair of housings, the second rotor includes a projection provided in a radially projecting manner between the first seat member and the second seat member.

8. The apparatus according to claim 1, wherein the contact surface is formed to incline with respect to an imaginary line extending radially from the axial line so that when the seat member is pushed onto the lateral end surface of the housing by a pressing force, a component force of the pressing force acts toward a radially inward side.

9. The apparatus according to claim 1, wherein the first rotor includes a pair of plates connected with each other and arranged parallel to each other along the axial line, and the housing is constructed of a pair of depressions provided in surfaces facing each other of the pair of plates.

10. The apparatus according to claim 9, wherein the second rotor includes an inner plate accommodated between the pair of plates in a manner rotatable relative to the pair of plates.

11. The apparatus according to claim 1, wherein the first rotor is connected to an output shaft of an engine mounted on a vehicle, and the second rotor is connected to an input shaft of a transmission mounted on the vehicle.

* * * * *